US006968098B2

(12) United States Patent
Barrett

(10) Patent No.: US 6,968,098 B2
(45) Date of Patent: *Nov. 22, 2005

(54) METHOD FOR PROVIDING VARIABLE OPTICAL ATTENUATION

(75) Inventor: Todd Barrett, San Diego, CA (US)

(73) Assignee: Trex Enterprises Corporation, San Diego, CA (US)

(*) Notice: Subject to any disclaimer, the term of this patent is extended or adjusted under 35 U.S.C. 154(b) by 223 days.

This patent is subject to a terminal disclaimer.

(21) Appl. No.: 09/960,223

(22) Filed: Sep. 20, 2001

(65) Prior Publication Data

US 2002/0094149 A1 Jul. 18, 2002

Related U.S. Application Data

(63) Continuation-in-part of application No. 09/846,879, filed on Apr. 30, 2001, now Pat. No. 6,731,833.
(60) Provisional application No. 60/273,433, filed on Mar. 5, 2001, provisional application No. 60/262,262, filed on Jan. 16, 2001.

(51) Int. Cl.[7] .............................................. G02B 6/26
(52) U.S. Cl. ........................... 385/15; 385/18; 385/24; 385/52
(58) Field of Search ............................. 385/15–19, 24, 385/31–33, 39, 47, 52

(56) References Cited

U.S. PATENT DOCUMENTS

| 5,177,348 A | * | 1/1993 | Laor ....................... 250/201.1 |
| 6,137,941 A | | 10/2000 | Robinson |
| 6,149,278 A | | 11/2000 | Mao et al. |
| 6,163,643 A | | 12/2000 | Bergmann et al. |
| 6,275,320 B1 | | 8/2001 | Dhuler et al. |
| 6,549,691 B1 | * | 4/2003 | Street et al. .................. 385/18 |
| 6,614,982 B2 | * | 9/2003 | Barrett ....................... 385/140 |
| 2002/0054422 A1 | * | 5/2002 | Carr et al. .................. 359/291 |

* cited by examiner

Primary Examiner—Juliana Kang
(74) Attorney, Agent, or Firm—John R. Ross

(57) ABSTRACT

A method for attenuating an optical beam is provided, and in one embodiment, a communication beam and associated alignment beam are generated by a beam generating element. The alignment beam may later be sampled by a sensor that can provide a relative location of the alignment beam with respect to the sensor. The communication beam may then be positioned so that a desired percentage of the communication beam enters an output fiber. Information, such as alignment beam offset, may be used to position the communication beam. In another embodiment, optical beam attenuation may be provided by using one or more reflecting devices, such as a MEMS device. In this configuration, a MEMS device may position a focused communication beam in such a manner that a desired percentage of the communication beam enters an output fiber.

33 Claims, 12 Drawing Sheets

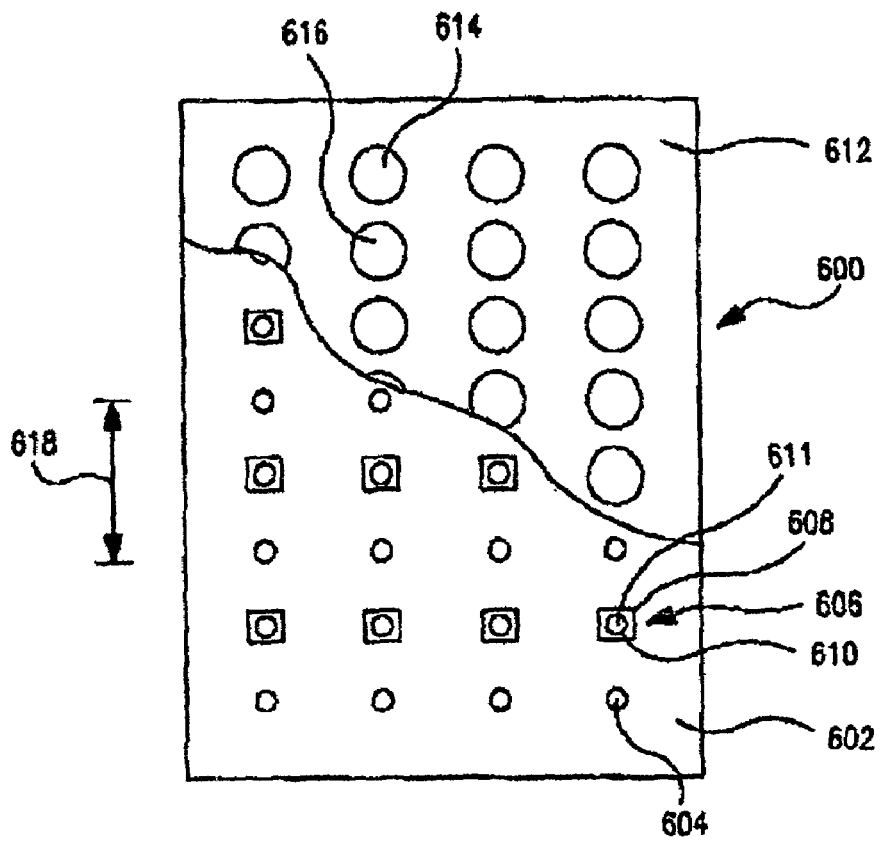
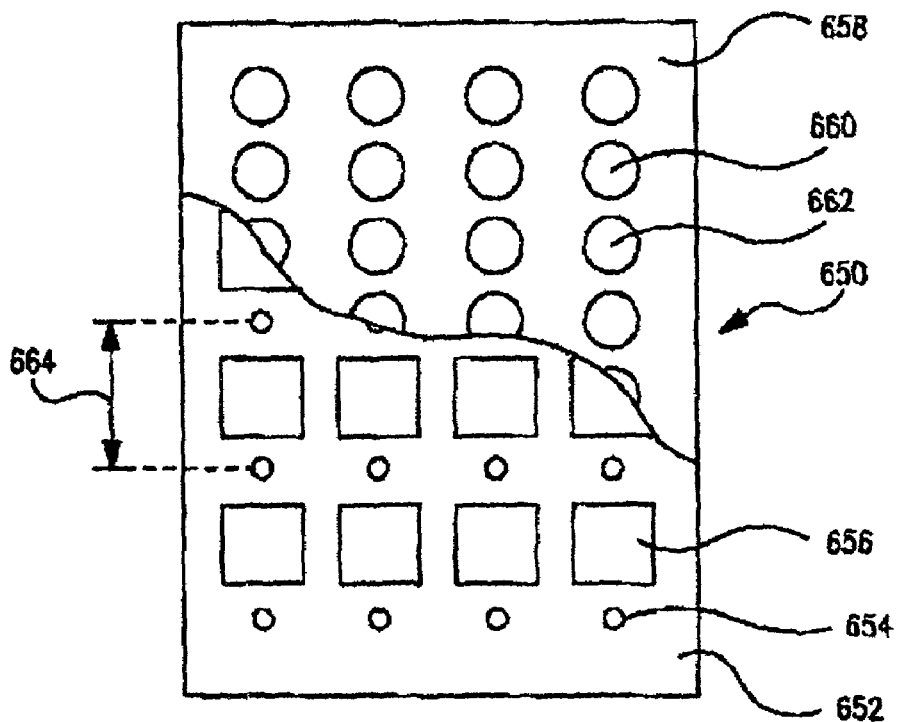
FIG. 8

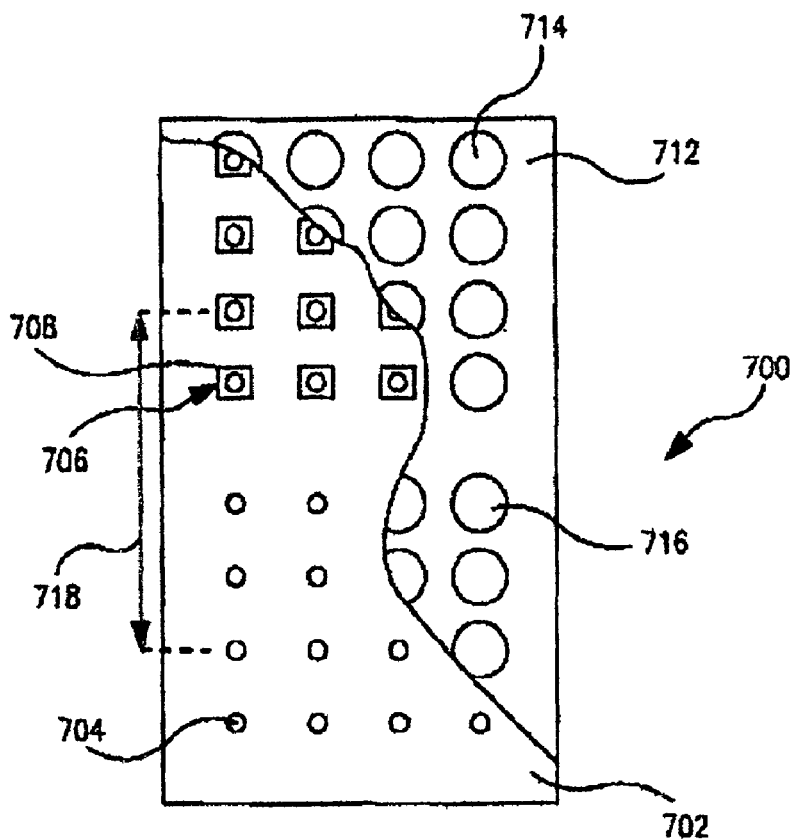
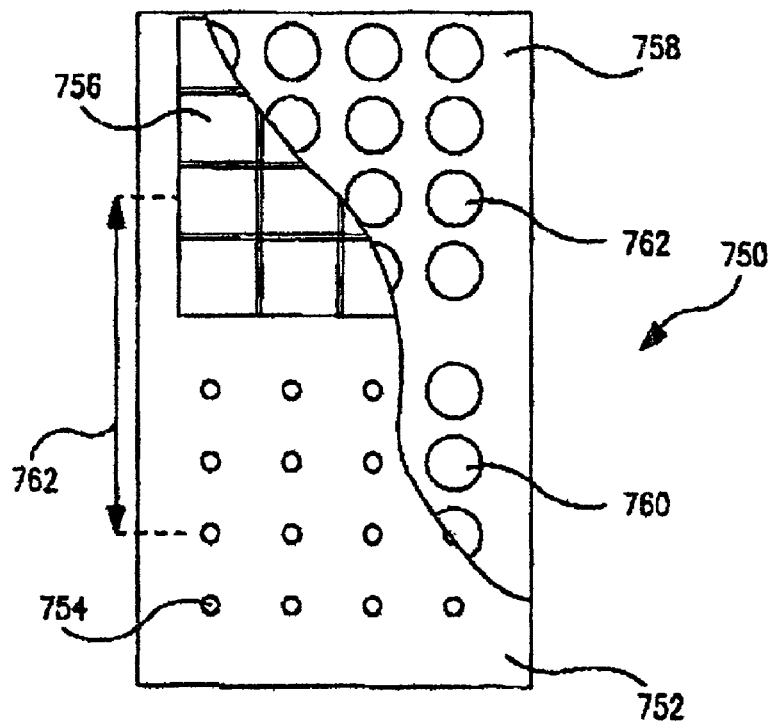
FIG. 9

METHOD FOR PROVIDING VARIABLE OPTICAL ATTENUATION

RELATED APPLICATIONS

This application is a continuation-in-part of patent application Ser. No. 09/846,879, entitled "OPTICAL CROSS CONNECT SWITCH" filed Apr. 30, 2001, now U.S. Pat. No. 6,731,833 which is a continuation-in-part of provisional patent application Ser. No. 60/262,262, entitled "METHOD OF SENSING THE POINTING OF THE INDIVIDUAL BEAMS PROPAGATING FROM AN ARRAY OF OPTICAL FIBERS AND STABILIZING THE POSITION OF THESE BEAMS" filed Jan. 16, 2001, and provisional patent application Ser. No. 60/273,433, entitled "OPTICAL CROSS CONNECT SWITCHING SYSTEM" filed Mar. 5, 2001.

FIELD OF THE INVENTION

The present invention relates to an optical attenuator, and in particular, to variable optical attenuator that may utilize an alignment beam for control of the attenuation.

BACKGROUND OF THE INVENTION

Over the past several decades, the telecommunications industry has exploded, and the incorporation of optical fiber into this industry is revolutionizing the way information is transmitted. Communication systems which use optical fiber as the transmission media offer some significant advantages over traditional wire-based systems, such as higher bandwidths and transmission rates, lower transmission losses, lower implementation costs, and greater electrical isolation.

Optical components utilized in these optical fiber communications systems typically require an ability to operate over a wide range of power levels. Devices, such as optical attenuators, have been developed to control optical signal power attenuation. Several types of optical attenuators have been developed, but these systems and devices have several drawbacks.

For example, one system attempts to provide optical attenuator by varying the orientation between a pair of optical fibers. In this type of system, one fiber is maintained in a fixed position while the other fiber is mounted on a moveable surface so that its terminal end can be axially or angularly moved relative to the fixed fiber. In these types of systems, signal attenuation is described as being accomplished by moving one fiber relative to another, causing an imperfect transmission between the fibers.

Other systems utilize a variety of different types of signal blocking devices in an attempt to provide optical signal attenuation. One system, for example, describes an ability to provide signal attenuation by moving a light blocking member that is disposed between two optical fibers. These signal blocking systems include the utilization of optical shutters that are controlled by thermal actuators or other types of micro electromechanical systems (MEMS) devices.

Despite the problems inherent to the optical attenuators currently available, single mode (SM) fiber, with its virtually unlimited bandwidth, has slowly become the standard in the telecommunication industry. Since the diameter of the core in a SM fiber is approximately ten (10) microns, the optical attenuators which use crude drive mechanisms are incapable of precise signal attenuation.

In view of the foregoing, a present need exists for an optical attenuator that can provide optical signal attenuation over a full optical power range. Additional need exists for precise control over the optical attenuation, allowing for the transmitted optical power to be dynamically altered as may be required by a specific application.

SUMMARY OF THE INVENTION

The variable optical attenuator of the present invention may be configured to generate a communication beam at an optical input fiber, as well as an associated alignment beam at a beam generating element. The alignment beam may be received by a sensor that can provide a relative location of the alignment beam with respect to the sensor. The communication beam may then be positioned so that a desired percentage of the communication beam enters an output fiber, where the positioning of the communication beam utilizes information, such as the offset from the location of said alignment beam.

In accordance with another aspect of the present invention, the positioning of the communication beam is performed by directing the communication beam to a MEMS device, and then positioning the MEMS device so that the desired percentage of the communication beam enters the output fiber.

In another aspect of the present invention, positioning is performed by directing the communication beam to a first MEMS device which may be positioned so that the communication beam is reflected from a surface and is redirected to a second MEMS device. The second MEMS device may be positioned so that the desired percentage of the communication beam enters the output fiber.

In still yet another aspect of the present invention, the alignment beam may be repeatedly received to provide updated locations of the alignment beam. Then the communication beam may be repositioned as necessary to reflect any change in location of the alignment beam to maintain the desired percentage of the communication beam that enters the output fiber.

In another aspect of the present invention, the desired percentage of the communication beam that enters the output fiber may be repeatedly determined to ascertain whether the desired percentage has changed. As such, the communication beam may be repositioned as necessary to reflect any change in the desired percentage of the communication beam that enters the output fiber.

In yet another aspect of the present invention, the communication beam may be positioned at about a center of a core in the output fiber so that about all of the communication beam enters the output fiber. Alternatively, the communication beam may be positioned at an offset from a center of a core in the output fiber so only a portion of the communication beam enters the output fiber.

In still yet another aspect of the present invention, each of a plurality of locations on the sensor corresponds to a particular offset that the communication beam enters the output fiber.

In yet another aspect of the present invention, the communication beam and alignment beam may be generated at a beam generation element, and then proceed along paths that are either substantially parallel, parallel, converging, or coaxial.

In accordance with another aspect of the present invention, the sensor may comprise a sensor, such as a position sensitive diode (PSD), a charge coupled device (CCD), or a light sensitive CMOS sensor.

In another aspect of the present invention, the alignment beam may be generated by a light source, such as a light emitting diode (LED), an optical fiber, a laser, or a vertical cavity surface emitting laser (VCSEL).

In still yet another aspect of the present invention, lenslets may be provided at the beam generating element and/or at the beam receiving element to provide collimating and focusing as may be necessary.

In yet another aspect of the present invention, optical beam attenuation may be provided by using a single, or even multiple reflecting devices. In this configuration, a beam generating element may comprise an optical input fiber and a first lenslet. A beam receiving element may also be provided, which may comprise an optical output fiber and a second lenslet. Typically, a communication beam is generated at the optical input fiber and then collimated by the first lenslet. The collimated communication beam may then be directed to a MEMS device, which may reflect the beam so that it can pass through the focusing lenslet. The focused communication beam may then be positioned so that a desired percentage of the communication beam enters an output fiber. The communication beam positioning may be provided by one or more of the MEMS devices using, for example, the known relative locations of the input fiber and the output fiber.

BRIEF DESCRIPTION OF THE DRAWINGS

The nature, objects, and advantages of the present invention will become more apparent to those skilled in the art after considering the following detailed description in connection with the accompanying drawings, in which like reference numerals designate like parts throughout, and wherein:

FIG. 8 is a plan view of an alternative architecture for the beam generating portion and beam receiving portion of the variable optical attenuator of the present invention with parts cut away for clarity;

FIG. 9 is a plan view of another alternative architecture for the beam generating portion and beam receiving portion of the variable optical attenuator of the present invention with parts cut away for clarity;

DETAILED DESCRIPTION OF A PREFERRED EMBODIMENT

The variable optical attenuator of the present invention may be utilized in a variety of optical systems, such as a fiber optic network, fiber optic telecommunications system, and also within data communications systems and networks. The devices of the present invention may also be utilized, for example, within optical sensor arrays, optical signal routing systems, optical switches, and the like. Several exemplary optical switches that may utilize the variable optical attenuator of the present invention will now be described.

Variable Optical Attenuator

Figure 1:
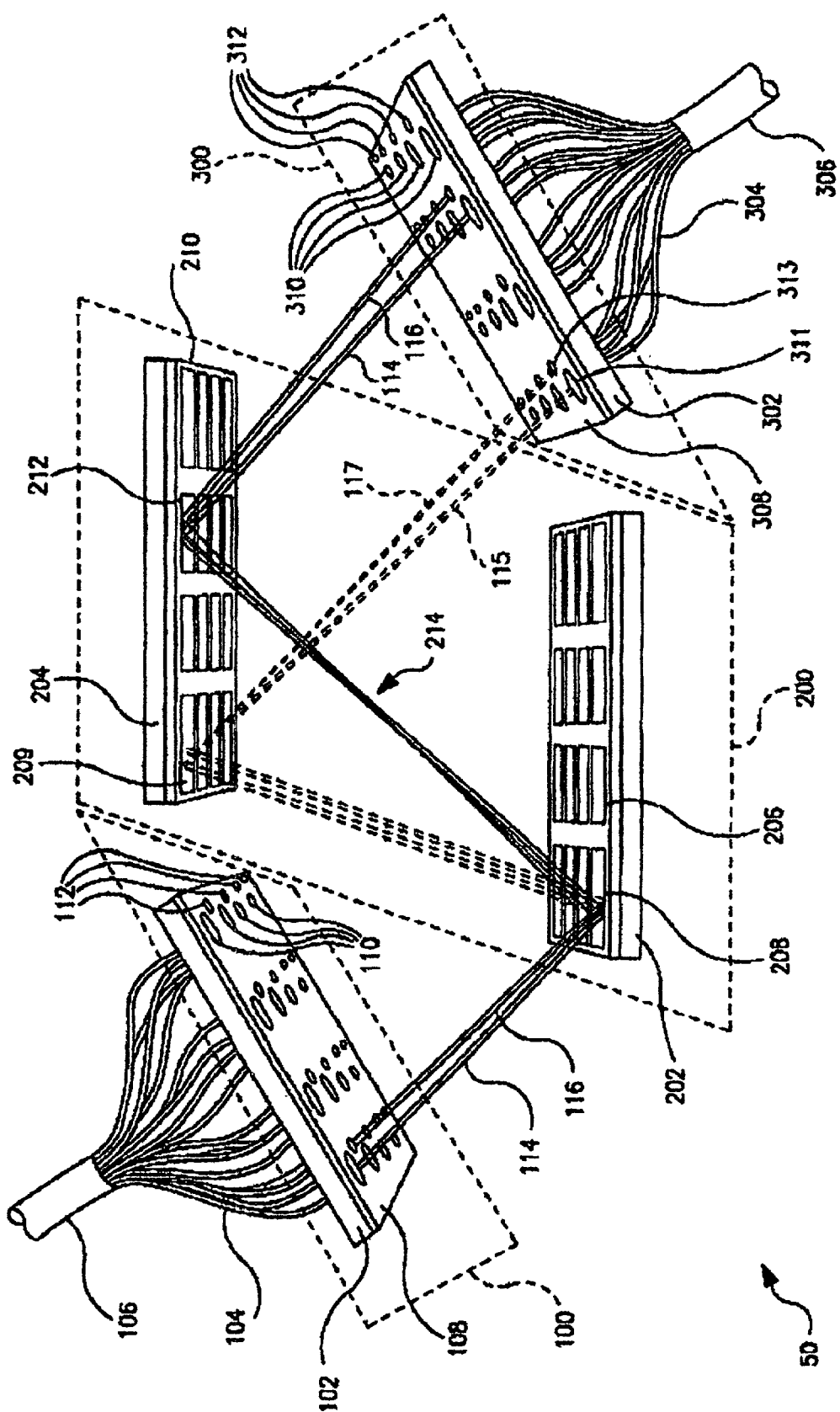
FIG. 1 is a diagrammatic representation of the variable optical attenuator of the present invention showing the three (3) basic components, including a beam generating portion, beam directing portion, and beam receiving portion.

Referring initially to FIG. 1, a diagrammatic representation of an optical cross-connect switch that may utilize the variable optical attenuator of the present invention is shown and generally designated 50. Attenuator 50 includes three (3) basic components, including a beam generating portion 100, a beam directing portion 200, and a beam receiving portion 300. Beam generating portion 100 includes a substrate, or platform, 102 which receives a number of optical fibers 104 leading from a bundle 106 of optical fibers 104. A lenslet panel 108 is positioned adjacent substrate 102 and is formed with an array of communication lenslets 110 for creating a number of communications beams 114, and an array of alignment lenslets 112 for creating a number of alignment beams 116.

Beam generating portion 100 may be configured with the input fibers 104 being placed in a two-dimensional array. For example, the array shown in FIG. 1 is a 4×4 array corresponding to sixteen (16) communication beams. It should be appreciated, however, that the present invention may be utilized in optical cross connect switches of varying sizes, such as 2×2, 16×16, 32×32, 100×100, for example. It is to be further understood that although the variable optical attenuator of the present invention may be used in an optical signal switching device, the present invention is not so limited and may be used in non-switching devices, such as a device that optically couples one or more fibers (e.g., an input and output fibers).

Beam directing portion 200 includes a first beam director 202 and a second beam director 204, with each director 202 and 204 having an array of beam-directing elements 206, 208, 210, and 212. As will be discussed below in greater detail, these beam-directing elements may include micro electromechanical systems (MEMS) devices.

Beam receiving portion 300 includes a substrate 302 which receives a number of output fibers 304 from a fiber bundle 306. Adjacent substrate 302 is a lenslet panel 308 which is formed with an array of communication lenslets 310 for receiving the communication beam 114, and an array of alignment lenslets 312 for focusing the alignment beam 116 onto a portion of the substrate 302.

In summary, the operation of the optical attenuator of the present invention includes the generation of a communication beam 114 and its associated alignment beam 116 in the beam generation portion 100. As shown, these beams 114 and 116 are directed to a beam directing element 208 on first beam director 202 of the beam directing portion 200, which are then directed to a second beam directing element 212 on second beam director 204. From second beam directing element 212, both the communication beam 114 and its associated alignment beam 116 are directed to beam receiving portion 300 where the beams 114 and 116 strike lenslets 310 and 312, respectively. The alignment beam 116 may then be received by a sensor that may provide a location of the alignment beam 116. Beam directing element 212, for example, may utilize the location of the alignment beam 116, as well as other information, so that the communication beam 114 may be directed in such a manner that a desired percentage of the beam enters an output fiber.

The size and configuration of the array of beam directing elements 206 and 208 on first substrate 202 corresponds to the size and configuration of the beam generating portion 100. In the present embodiment, the configuration is a 4×4 array. However, as noted above, it is to be appreciated that the present invention may be scaled to any size configuration, without any significant increase in complexity of the manufacturing, alignment, or corresponding control system.

As shown, the communication beam 114 and corresponding alignment beam 116 are generated by the lowermost and leftmost lenslets 110 and 112 of beam generation portion 100. These beams 114 and 116 then propagate directly to the beam directing element 208 on first substrate 202 in beam directing portion 200. Importantly, there is a direct correlation between the particular communication beam generating lenslet 112 and beam directing element 208. In other words, each of the communication beams 114 and its associated alignment beams 116 propagate to a unique beam directing element 208.

Like the relationship between the beam generating portion 100 and first substrate 202 in beam directing portion 200, each communication lenslet 310 and its corresponding alignment beam lenslet 312 in beam receiving portion 300 correspond to a single beam directing element 212 in second substrate 204 of beam directing portion 204. Again, there is a direct correlation between the particular communication beam receiving lenslet 310 and beam directing element 212.

It is to be appreciated, as noted above, that the variable optical attenuator of the present invention may be used in conjunction with an optical switch. An appropriate optical switch may provide the selective switching of the communication beam 114 from one input fiber 104 to an output fiber 304 during the selective positioning of beam directing elements 208 and 212. More specifically, because each input fiber 104 may be associated with its own unique communication beam lenslet 110 which generates communication beam 114, and each output fiber 304 may be associated with its own unique communication beam lenslet 310 which receives communication beam 114, then the selective switching of a communication beam between the input fiber 104 and the output fiber 304 occurs between first substrate 202 and second substrate 204 in beam directing portion 200.

As an illustration of how the variable optical attenuator 50 may include a cross-connect switch is also shown in FIG. 1. In particular, this Figure shows a communication beam 115 (shown in dashed lines) and an alignment beam 117 (shown in dashed lines). These beams 115 and 117 represent an alternative switching position for beam directing portion 200. For example, first beam direction element 208 on first substrate 202 directs the communication beam 115 and alignment beam 117 to second beam direction element 209 on second substrate 204 which in turn directs beams 115 and 117 to communication beam lenslet 311 and alignment lenslet 313, respectively. As shown, communication and alignment lenslets 311 and 313 correspond to beam directing element 209 in second substrate 204.

Using the signal switching approach discussed above, it can be appreciated that a communication beam 114 from any input fiber 104 may be directed to any output fiber 304. More specifically, by changing the orientation of the appropriate beam directing element in the first substrate 202 corresponding to the input fiber 104, to direct the communication and alignment beams to any one of the beam directing elements in the second substrate 204 corresponding to the output fiber 304.

It can be seen from FIG. 1 that communication beam 114 and alignment beam 116 converge slightly from lenslet panel 108 such that the beams 114 and 116 intersect at location 214, approximately half of the optical beam path of the variable optical attenuator 50. The benefits of this slight convergence, and alternatives to such convergence, are discussed more fully in conjunction with FIG. 3.

Beam Generating Portion

Figure 2:
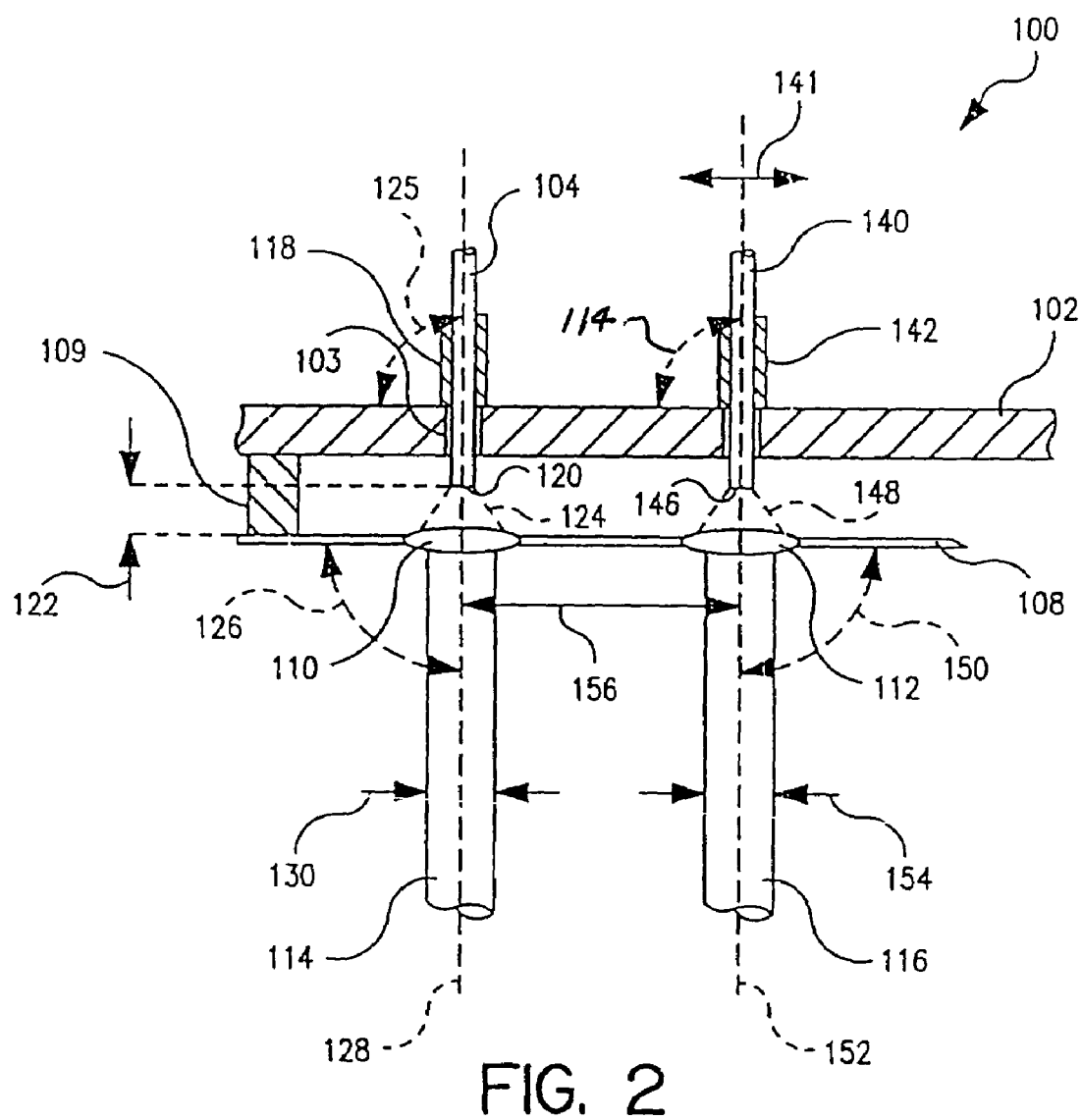
FIG. 2 is a cross-sectional view of the beam generating portion of the variable optical attenuator of the present invention showing the input fiber and its associated lenslet which generate a communication beam, and the alignment fiber and its associated lenslet which generate an alignment beam.

Referring now to FIG. 2, a cross-sectional view of the beam generating portion 100 is shown. Beam generating portion 100 includes a substrate 102 formed with a number of fiber alignment holes 103 that receive fibers 104 from bundle 106 (not shown in this Figure). Lenslet panel 108 is substantially parallel and spaced apart from substrate 102, and held rigidly in place. In a preferred embodiment, lenslet panel 108 may be secured to substrate 102 with spacers 109, but any other manner of maintaining the relative positions between substrate 102 and lenslet panel 108 may be used.

To facilitate the mounting and positioning of the fibers 104 relative to substrate 102, each fiber may be inserted into a ferrule 118. Typical ferrules have precise dimensions which are known, and thus, the location of input fiber 104 may be determined to a high degree of accuracy.

To further minimize positional errors in the locations of fibers 104, substrate 102 is made from a dimensionally stable material, including silicon, ceramic or alumina, for example. This material provides for the precision formation of fiber alignment holes 103 using laser drilling techniques. This provides a substantially smooth wall for fiber alignment hole 103 which facilitates the proper positioning of fibers 104.

As discussed above, lenslet panel 108 is equipped with an array of lenslets 110 and 112 for generating a separate and autonomous communication beam 114 and an alignment, or guidance, beam 116. As shown in FIG. 2, the end 120 of input fiber 104 extends slightly from ferrule 118 and generates a diverging light source 124 (shown in dashed lines). Lenslet 110 is separated from end 120 by a distance 122 which, in a preferred embodiment, is approximately the focal length of the lenslet 110. As a result, lenslet 110 receives substantially all light from input fiber 104 and generates communication beam 114, that is substantially collimated, and has a diameter 130.

The angle 125 between input fiber 104 and substrate 102 contributes to the communication beam angle 126. In one embodiment, this angle 125 may be ninety degrees (90°), resulting in a communication beam angle 126 of ninety degrees (90°) and propagating along optical axis 128.

Substrate 102 also receives a light source for generating alignment beam 116. In one embodiment, a light supplying fiber 140 is received in ferrule 142 and positioned at an angle 144 to substrate 102. Like the input fiber 104, fiber 140 provides a diverging light source 148 (shown in dashed lines) which strikes lenslet 112 to create alignment beam 116. The angle 150 of the optical axis 152 of alignment beam 116 may vary as a result of the angle 144 of light supplying fiber 140.

Angle 150 may also be changed by varying the placement of light supplying fiber 140 relative to lenslet 112. More specifically, by positioning light supplying fiber 140 in direction 141, the diverging light source 148 strikes lenslet 112 off of the optical axis. As is well known in the art, this off-axis position creates an angle 150 of alignment beam 116. While two separate methods for directing alignment beam 116 have been discussed, it should be appreciated that any manner of directing alignment beam 116 at an angle 150 known in the art are fully contemplated herein.

Angle 126 of communication beam 114 and angle 150 of alignment beam 116 may be varied by changing the angles 125 and 144 of the fibers 104 and 140, respectively. Thus, although beams 114 and 116 are separated by a distance 156, these beams may converge, diverge or remain parallel.

Beam Directing Element

Figure 3:
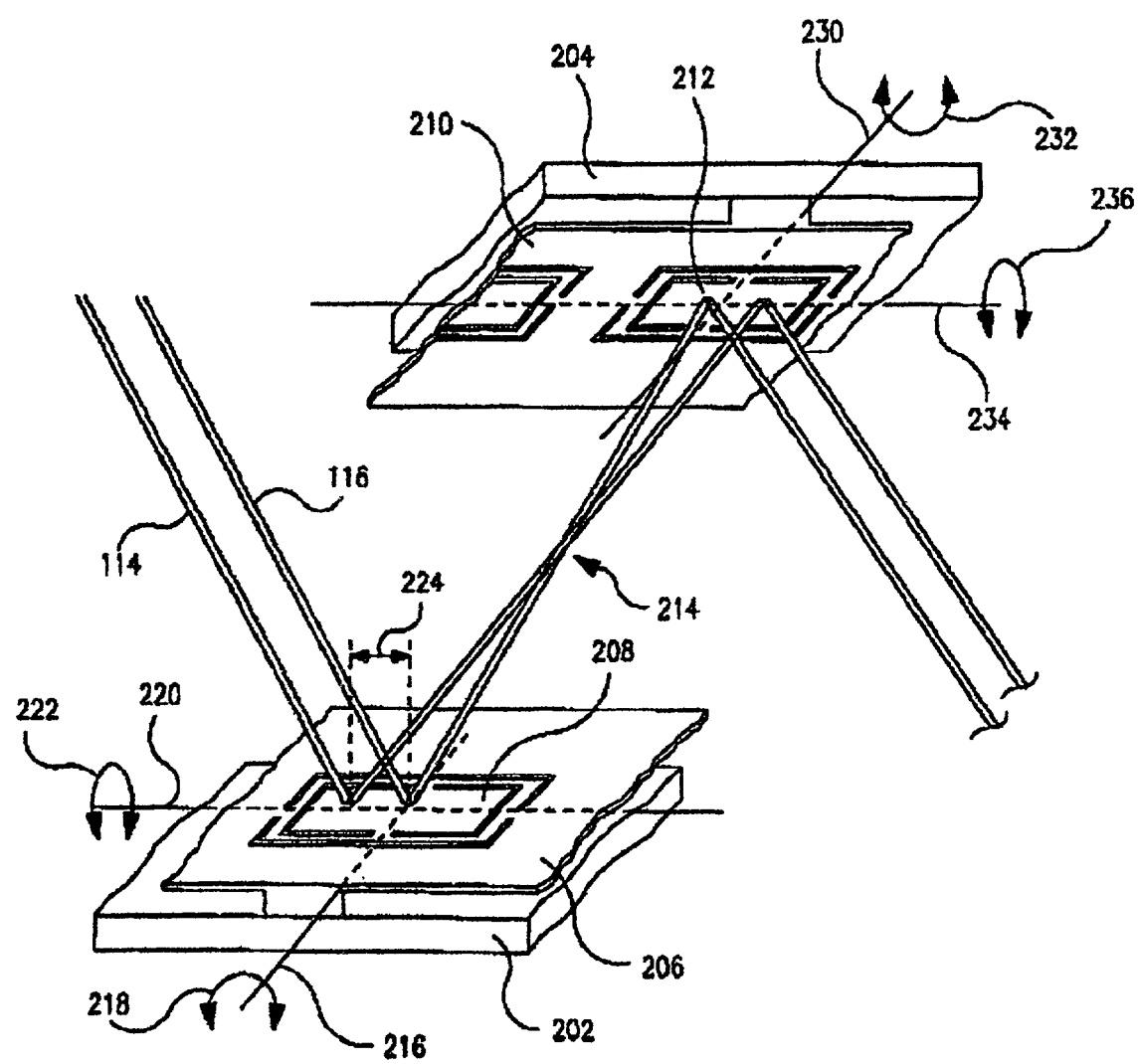
FIG. 3 is a side view of the beam directing portion of the variable optical attenuator of the present invention showing the first beam director, second beam director, and the communication beam and alignment beam as they propagate between the first beam director and second beam director.

Referring now to FIG. 3, a side view of the beam directing portion 200 that may be utilized by the variable optical attenuator of the present invention is shown. Beam directing portion 200 includes a first beam director 202 and a second beam director 204, each formed with a number of beam directing elements 206, 208, 209, 212, for example.

In a preferred embodiment, beam directing elements include a micro electromechanical system, also referred to as a MEMS device. As it is known in the art, MEMS devices are manufactured of silicon using techniques similar to those techniques for manufacturing semiconductor devices. MEMS devices can vary the orientation of its substantially planar reflective surface by varying the voltages applied to the device. Typically, the reflective surface may be rotated about two (2) axes, where the axes are orthogonal.

In FIG. 3, each of the beam directing elements 206, 208, 209, 212 are constructed to pivot about two axis. More specifically, beam directing element 208 in first beam director 202 has a first axis of rotation 216 which allows for the rotation of the element in direction 218, and a second axis of rotation 220 which allows for rotation of the element in direction 222. Similarly, beam directing element 212 in second beam director 204 has a first axis of rotation 230 which allows for rotation of the element 212 in direction 232, and a second axis of rotation 234 which allows for rotation of the element 212 in direction 236. Preferably, axes 216 and 220 are perpendicular, and axes 230 and 234 are perpendicular, however, non-perpendicular orientations are also contemplated, and fully within the scope of the present invention.

As shown in FIG. 3, communication beam 114 and alignment beam 116 propagate from beam generating portion 100 to strike beam directing element 208 within beam directing portion 200. Since beam directing element 208 may be rotated about axes 216 and 220, the communication beam 114 and alignment beam 116 may be redirected to any beam directing element on second beam director 204 simply by rotating about its axes. Thus, as discussed above in conjunction with FIG. 1, communication beam 114 and alignment beam 116 may be directed to any beam directing element on second beam director 204, which in turn directs the beams to its associated output fiber 304 in beam receiving portion 300.

Although one embodiment of the present invention may be utilized in a system having two beam directing elements (e.g., beam directors 202, 204), it is to be understood that the optical attenuator of the present invention is not so limited. As will be described in detail herein, the present invention may provide optical attenuation by using additional, or fewer, beam directing elements.

Beam Receiving Portion

Figure 4:
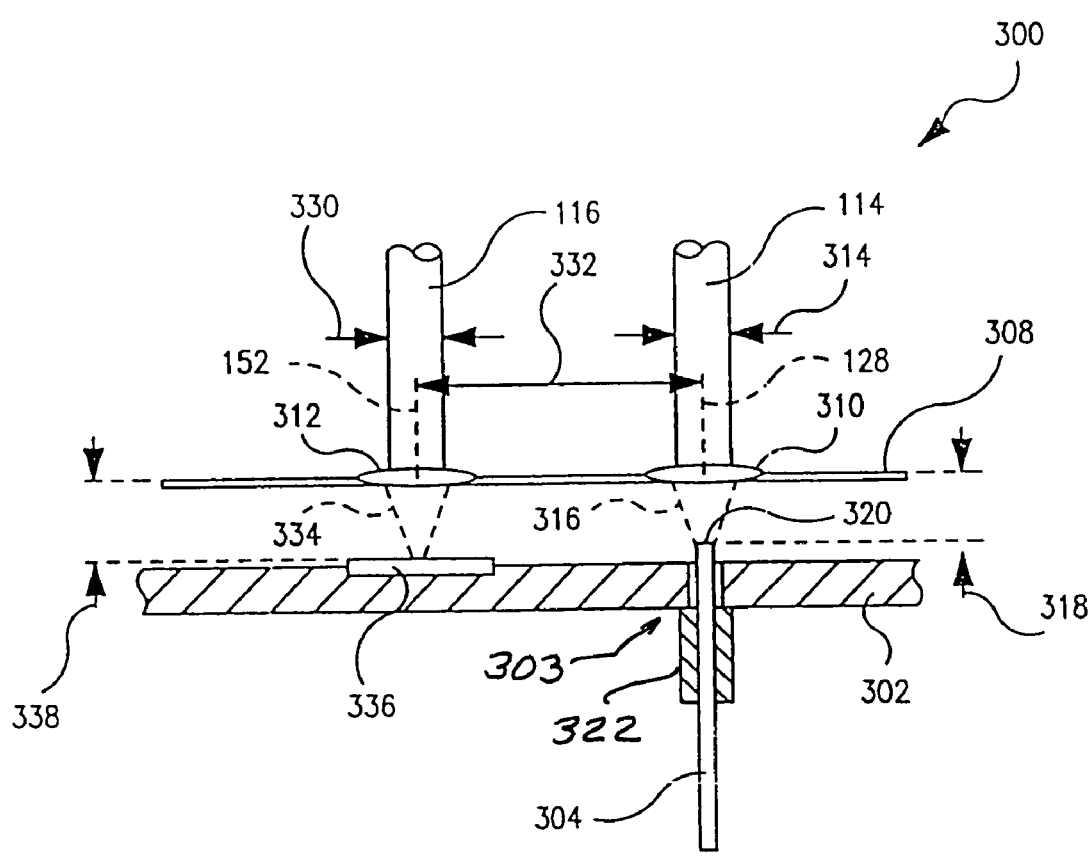
FIG. 4 is a cross-sectional view of the beam receiving portion of the variable optical attenuator of the present invention showing the communication beam which is directed to its output fiber through its associated lenslet, and the alignment beam which is directed to the alignment sensor through its associated lenslet.

Referring now to FIG. 4, a cross-sectional view of an exemplary beam receiving portion 300 that may be utilized by the present invention is shown. Beam receiving portion 300 includes a substrate 302 formed with an fiber alignment hole 303 that receives an output fiber 304. Lenslet panel 308 contains lenslets 310 and 312, and which receive communication beam 114 and alignment beam 116, respectively. Like the beam generating portion 100, lenslet panel 308 is held substantially parallel to substrate 302, such as with spacers (not shown this Figure). Optical fiber 304 may be held in place through substrate 302 with a ferrule 322. The end 320 of fiber 304 is retained in place at a distance 318 from lenslet 310. Preferably, distance 318 is equal to the focal length of lenslet 310 such that the communication beam 314 passes through lenslet 310 and converges onto end 320 (as shown by the light pattern 316).

Alignment beam 116 strikes lenslet 312 and is focused into a converging light pattern 334 (shown in dashed lines) that converges onto sensor 336 on substrate 302. Preferably, the focal length of lenslet 312 is equal to distance 338 such that the alignment beam is focused onto the surface of the sensor 336. Alternatively, the focal length of lenslet 312 may be greater or less than distance 338. In fact, lenslet 310 may be omitted entirely from the lenslet panel 308 allowing alignment beam 116 to strike sensor 336.

As shown above in conjunction with FIGS. 1, 2, 3 and 4, the communication beam 114 and alignment beam 116 converge slightly such that the two beams intersect at the approximate midpoint of the optical pathway between the beam generating portion 100 and the beam receiving portion 300. There are several advantages to this convergence. For example, by converging the communication and alignment beams 114 and 116, the distance 224 between the contact points on the beam directing element 208 is minimized. By minimizing this distance 224, the physical dimensions of each beam directing element 208 may be minimized which in turn allows for a smaller beam directing portion 200. Further, by converging the beams 114, 116 to intersect at the approximate midpoint of the optical pathway, the distance 156 between the input fiber 104 and alignment light source 140, and the distance 332 between the output fiber 304 and the center of the sensor 336, are approximately equal. This equality is useful in the initial positioning the beam directing elements, as will be discussed in greater detail below.

As an alternative to the slight convergence of beams 114 and 116, the beams may be positioned such that they are substantially parallel. By being parallel, the angle of incidence of the communication beam 114 on the beam directing elements 208 and 212 is identical to the angle of incidence of the alignment beam 116 on the same beam directing elements. Consequently, there is a direct correlation between the distance 156 between the communication beam 114 and the alignment beam 116 in the beam generation portion 100, and the distance 332 between the communication beam 114 and the alignment beam 116 in the beam receiving portion 300. In fact, in some instances, distances 156 and 332 will be the same, which provides for the initial positioning of the beam directing elements.

While FIGS. 1, 2, 3, and 4 have shown communication beam 114 and alignment beam 116 having diameters 130 and 154, respectively, it is to be appreciated that these graphical representations are for discussion purposes, and that the relative sizes and proportions shown in these figures is not to be considered as any limitation whatsoever of the present invention. Rather, it is to be appreciated that the diameters 130 and 154 of the beams 114 and 116 may be greater or smaller, and that the sizes of the lenslets 110 and 112 may also be smaller or larger. Also, distances 156 and 332 may also be smaller or larger, depending on the particular design of the present invention.

Figure 5A:
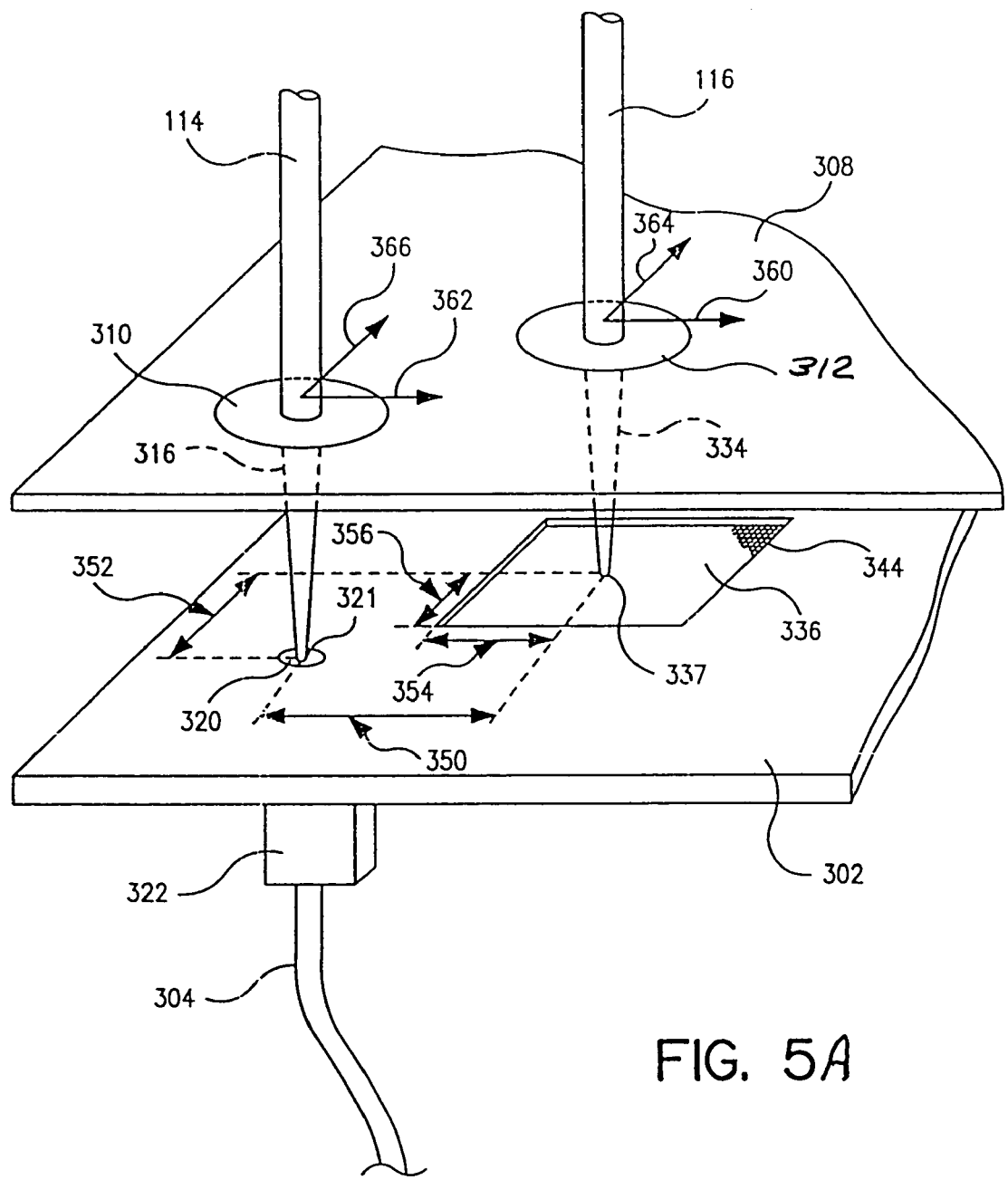
FIG. 5A is a perspective view of the beam receiving portion of the variable optical attenuator of the present invention showing the relationship between the position of the communication beam on the output fiber and the alignment beam on the alignment sensor.

Referring now to FIG. 5A, a perspective view of the beam receiving portion 300 of the present invention is shown. This Figure illustrates a spatial relationship between the output fiber 304, sensor 336, and the communication and alignment beams 114, 116. The diameter of the core 321 in a typical single mode (SM) optical fiber is approximately seven micrometers (7 $\mu$m). However, the present invention is not limited to a particular diameter size and optical fibers having cores of varying diameters (e.g., 2–15 $\mu$m) may also be used.

It is to be understood that by controlling the amount of overlap between the light pattern 316 and core 321 of output fiber 304, the amount of the light transmitted into output fiber 304 may also be controlled. Put another way, one method of that the variable optical attenuator of the present invention utilizes to control the amount of light transmitted to output fiber 304 is to control the amount of overlap (e.g., 0–100%) between converging pattern 316 and core 321.

In situations where maximum light transmission to output fiber 304 is desired (i.e., minimization of insertion loss), the converging pattern 316 should, optimally, be positioned so that it converges onto the center of core 321. An example of a maximum light transmission configuration is shown in FIG. 5A. In particular, the positioning of the light pattern 316 over the center of core 321 illustrates one example of how a complete overlap of light pattern 316 and core 321 may occur.

In contrast, such as when the reduction of the amount of light transmission to output fiber 304 is desired (i.e., signal attenuation is desired), light pattern 316 may be directed so that it strikes core 321 at some predetermined offset. In this type of situation, a portion of light pattern 316 may be directed onto core 321, while the remaining portion of light pattern 316 falls outside the core 321. The amount of light pattern 316 that falls outside of the core 321 may be characterized as the insertion loss. By increasing or decreasing the amount of the light pattern 316 that is directed onto the core 321, the amount of insertion loss may likewise be increased or decreased.

It is well known that the amount of insertion loss is directly related to the amount of optical signal attenuation. Thus, by controlling the amount of insertion loss, the amount of optical signal attenuation may also be controlled. Accordingly, optical signal attenuation may be controlled by controlling the amount of light pattern 316 that is directed onto core 321.

Exemplary methods of how the variable optical attenuator of the present invention controls the positioning of light pattern 316, and therefore the amount of light pattern 316 that is directed onto core 321, will now be described.

One method for positioning light pattern 316 is to utilize the alignment beam 116 and a position sensor 336. Specifically, position sensor 336 may be configured to provide data that can be used to calculate the location of light pattern 334 of the alignment beam 116 on sensor 336. For reasons that will become clear, once the location of light pattern 334 on sensor 336 is determined, the location of the light pattern 316 may be determined. As such, knowledge of the location of light pattern 334 may be used to locate and position light pattern 316 onto core 321.

Given any combination of beam director elements of beam directors 202 and 204, the spatial relationship between the position of the light pattern 316 on the output fiber core 321, and the light pattern 334 on the alignment sensor 336 is known. For example, the positioning of light pattern 316 may be represented as an offset from where the light pattern 334 strikes the sensor 336. The offset between alignment beam 116 and communication beam 114, and therefore between light patterns 334 and 316, will be characterized as a combination of an X-offset 350 and a Y-offset 352.

The particular offset values 350 and 352 for each combination of beam directing elements, for example, beam directing elements 208 and 212, are known. These values may be determined mathematically using the particular physical components of the attenuator 50, including the convergence angles 126 and 150 of the communication beam 114 and the alignment beam 116, the rotational position of the beam directing elements in directions 218, 222, 232, and 236, and the optical path length. Alternatively, the offset values may be measured by constructing or modeling the device 50 and measuring the offset values 350 and 352 for each combination of beam director elements.

Because the offset values 350 and 352 are known, positioning control of the light pattern 316 onto core 321 (i.e., a partial or complete overlap of light pattern 316 and core 321)) may be accomplished by controlling the positioning of light pattern 334 on sensor 336. This may be accomplished by adjusting the rotational positions of the beam director elements 208 and 212 to position the light pattern 334 at location 337, as identified by distance 354 and 356 on sensor 336. Once the light pattern 334 from the alignment beam 116 is positioned at location 337 within sensor 336, the light pattern 316 from communication beam 114 will likewise be positioned at the center 331 of core 321. Because the light pattern 316 is positioned so that it is directed at the center of core 321, insertion loss is minimized, and the signal transmission to output fiber 304 is maximized.

As mentioned above, one embodiment of the present invention provides for a wide range of signal attenuation by controlling the amount of overlap of light pattern 316 core 321. One method for accomplishing this is to adjust the distance 354 and/or the distance 356. For example, increasing distance 354 may be accomplished by adjusting the appropriate beam directors (as described above), which may then cause the light pattern 316 and light pattern 334 to move in directions 362 and 360, respectively. Similarly, increasing distance 356 may be accomplished by adjusting the appropriate beam directors (as described above), which may then cause the light pattern 316 and light pattern 334 to move in directions 366 and 364, respectively.

Distances 354 and 356 have a definable relationship with the position of light pattern 316 on core 321 because the spatial relationship between light pattern 316 and light pattern 334 is known (i.e., offsets 350 and 352). Thus, in one aspect of the present invention, a plurality of locations may be defined on sensor 336, each of which may be correlated to a particular location that light pattern 316 strikes core 321.

For example, location 337 may represent the location on sensor 336 that correlates to a maximum light transmission position such that light pattern 316 is positioned at about the center of core 321. Accordingly, one of ordinary skill will realize that the positioning of light pattern 316 with respect to core 321 may be accomplished by adjusting the location that light pattern 334 strikes sensor 336. As such, the present invention may provide variable optical signal attenuation by adjusting the position of light pattern 334 on sensor 336, which in turn may be used to control the amount of light pattern 316 that is directed onto core 321.

Figure 5B:
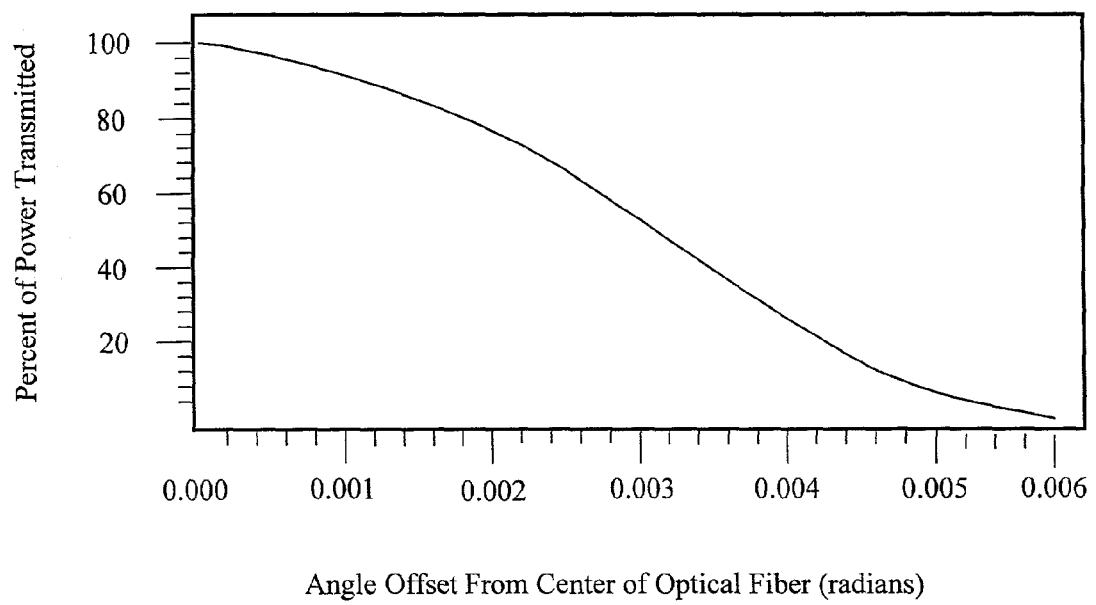
FIG. 5B is a graph illustrating an example of the correlation between the power of the signal transmitted and the offset angle that the output fiber receives the optical signal.

Referring now to FIG. 5B, a graph illustrating one example of the correlation between the optical signal transmission power and the offset angle that the output fiber receives the optical signal. However, it is to be understood that the data in this Figure is provided to illustrate some of the capabilities of the optical attenuator of the present invention. As such, one of ordinary skill will realize that the present invention is not so limited and may accommodate a variety of different power transmission levels and associated offset angles.

Referring still to FIG. 5B, a graph is plotted that illustrates a full range of power level transmission (i.e., signal attenuation from about 0 to 100 percent). The power transmission level represents a particular percentage of a received signal that actually enters the output fiber. In the present example, the power transmission level indicates the percentage of the communication beam 116 that is received by the output fiber 304.

The graph also illustrates that the power level of the optical signal that actually enters the output fiber decreases as the offset angle from the center of the output fiber increases. In the present example, a nearly full power (i.e., 100 percent) signal transmission occurs where little or no offset angle is present between the light signal and the receiving output fiber. This situation may occur when, for example, the light pattern 316 of communication beam 114 is positioned near the center of core 321 of output fiber 304. However, as the offset angle between the light pattern 316 and the center of core 321 increases (e.g., from about 0.001 to about 0.006 radians), the percent of power transmitted decreases (e.g. from about 100 percent to about 0 percent).

Accordingly, the present invention may provide variable optical signal attenuation (e.g. from about 100 percent to about 0 percent), by using an alignment beam and sensor, to control the positioning of light pattern 316 on core 321 (as described above).

Referring back to FIG. 5A, it is to be understood that sensor 336 may comprise a light-sensitive sensor which provides an output signal corresponding to the location where the alignment beam (e.g., light pattern 334) focuses on the sensor. A variety of suitable sensors could be fabricated using known technologies, including those technologies used in manufacturing an array of position sensitive diodes (PSD), a charge coupled device (CCD) panel, and a light sensitive CMOS array.

The PSD sensor provides a pair of analog voltages which correspond to the location where a light beam strikes the sensor. In one embodiment, sensor 336 would provide two (2) separate analog voltages corresponding to the location 337 on sensor 336 where focused light beam 336 strikes the sensor, with a first analog voltage corresponding to the distance 354, and a second analog voltage corresponding to the distance 356. These analog voltages may be measured to determine the positioning of the converging light pattern 334 of alignment beam 116, given the particular beam directors 208 and 212 which are being used. Again, knowledge of the location of light pattern 334 of alignment beam 116 may be used by the present invention to position the light pattern 316 of communication beam 114 onto core 321.

A CMOS pixel array may be used to precisely locate the light pattern 334 on sensor 336. Instead of providing an analog voltage corresponding to the location 337, a CMOS array may provide a two (2) dimensional array of pixels 344 which precisely image the converging light beam 334. This image may be analyzed to identify distances 354 and 356 to determine the location of light pattern 334 of alignment beam 116. Then, as described above, if positioning of light pattern 316 onto core 321 is desired, beam directors may be adjusted to move communication beam 114 and corresponding alignment beam 116 in directions 362 and 360, and 366 and 364, or a combination of those directions.

While directions 360, 362, 364 and 366 have been depicted in FIG. 5A as positive, it is to be appreciated that these directions are merely exemplary of movement of the communication beam 114 and corresponding alignment beam 116, and therefore the movement of light pattern 316 and light pattern 334, with respect to lenslets 310 and 312. This movement may be any direction, thus accommodating any location (e.g., location 337) where light pattern 334 strikes sensor 336.

In one embodiment of the present invention, location of the alignment beam 334 (e.g., location 337) may be determined in one of a variety of different manners. For example, a standard centroid calculation may be used. In this embodiment, the sensor may comprise an array of light sensitive pixels and the location of the "spot" is calculated by dividing the weighted sum of the measured pixel intensities by the total measured intensity of the beam. This, in effect, computes an intensity center of gravity which corresponds to the location of the center of the beam. Other, more advanced techniques for determining the location of the beam may also be used.

Control System

Figure 6:
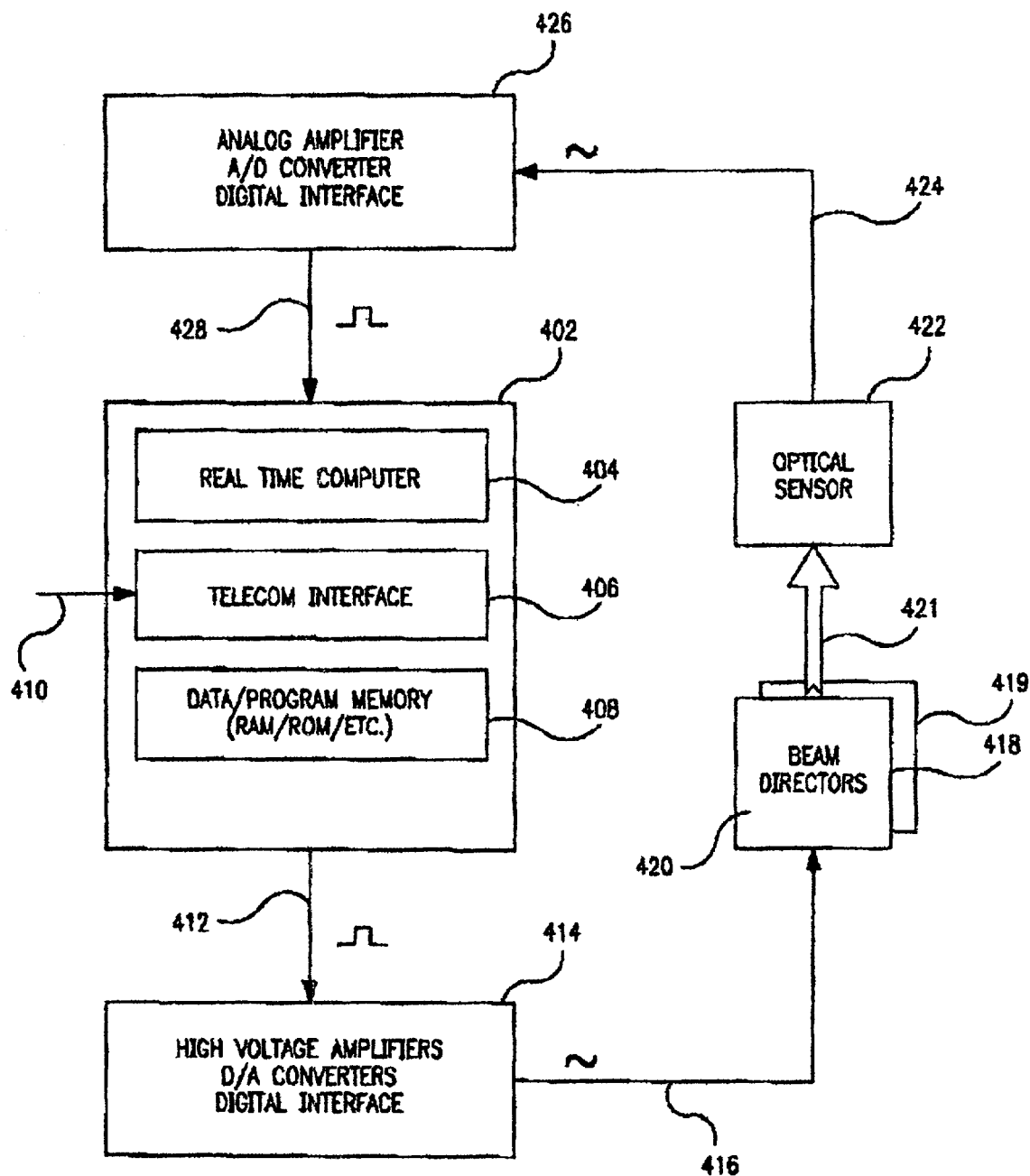
FIG. 6 is a block diagram of the control system of the variable optical attenuator of the present invention showing the computer control of the beam directing portion and its associated optical feedback.

Referring now to FIG. 6, a block diagram of a control system that may be utilized by the present invention is shown and generally designated 400. Control system 400 includes a computer 402 containing a real time computer 404, a telecommunications interface 406, and a digital storage device 408.

Computer 402 is a system capable of making the computations required to implement a closed-loop feedback control system. It may be comprised of analog or digital electronics, or may be implemented with optical computations units. In a preferred embodiment, the computer consists of digital electronics with at least one component capable of computation, and with at least three digital interfaces. The first interface would be capable of receiving the digitized optical feedback signals, the second interface would be capable of transmitting command signals to the analog electronic driver required for actuation of beam directors 202 and 204. And the third interface would be capable of receiving the network configuration command from an external source and transmitting the state of the optical switch. Other interfaces may be required for certain implementations.

In a preferred embodiment, the digital computation electronics could consist of one or more general purpose processors, such as a commercial available digital signal processor (DSP) or other central processing unit (CPU), or might be one or more application specific integrated circuits (ASIC) design specifically for this task. The digital interfaces could consist of any one of a large variety of parallel or serial links and may conform to some industry standards, or may be custom for a particular implementation.

Telecommunication interface 406 provides an electronic interface between computer 402 and a telecommunication exchange via interconnect 410. In a typical environment incorporating the variable optical attenuator 50 of the present invention, interconnect 410 will receive information (e.g. positioning, number, type, size, etc.) about the input fibers 104 and the output fibers 304, which are to be optically coupled. A standard format for receiving this information may be established by a particular telecommunications network, but it is to be appreciated that regardless of the particular protocol, this information may contain information regarding the particular positioning configurations which may be implemented by the present invention.

Digital storage device 408 may include both temporary and permanent digital memory media. For example, digital storage device 408 may include random access memory (RAM) for manipulation of data, and programmable read only memory (PROM) for storage of programed computer sequence steps, and may include tables of offset values (e.g., offset values 350, 352).

Computer 402 is electrically connected to digital interface 414 via electrical connection 416. Digital interface 414 contains high voltage amplifiers, and digital to analog converters (DACs) that convert digital information from computer 402 to the analog signals necessary to control the beam director elements (208 and 212 in FIG. 3), such as MEMS devices. Digital interface 414 also transmits and receives any necessary digital data between computer 402 and beam directors 418.

Beam directors 418 and 419 receive the electronic signals from interface 414 which drive each of the beam directing elements 420 to their particular rotational position in order to direct communication beam 114 from one input fiber 104 to its intended output fiber 304. More particularly, these signals may be used to drive the beam directing elements 420 to the appropriate position so that the light pattern 334 of the communication beam 114 may be correctly positioned on core 321 of the output fiber 304. In order to ensure that the beam directing elements 420 are properly positioned, optical sensor 422 measures the position of the alignment beam, depicted in FIG. 6 as optical feedback 421. Specifically, optical sensor 422 measures the position of the alignment beam 116 within the sensor area 336, and provides that position information electronically via electrical connection 424 to analog interface 426.

Analog interface 426 contains analog signal conditioning components, including analog amplifiers and analog to digital converters (ADCs), which receive the analog signals from optical sensor 422 and generate digital signals for transmission along electrical connection 428 to computer 402.

Computer 402 receives the electronic information from sensor 422 regarding the position of the alignment beam, and compares this position to the position contained in the memory 408 to determine whether the beam director elements 420 in beam directors 418 and 419 are properly positioned. That is, the information from sensor 422 is used to determine whether the alignment beam, and therefore the communication beam, are correctly positioned.

If there is a difference between the position of the alignment beam measured by sensor 422 and the position data contained in memory 408, computer 402 adjusts the electronic signals sent to digital interface 414 to modify the rotational position of beam director elements 420 and reposition the alignment beam within the sensor. The position of the alignment beam is then once again measured by optical sensor 422, and the adjustment to the rotational positions of the beam directing elements is repeated if necessary.

By positioning the alignment beam in this manner, the proper position of the communication beam may be achieved without any interference to the communication beam itself. Put another way, positioning of the communication beam so that it strikes the core of the output fiber at a desired offset, may provide for variable optical signal attenuation without causing any interference with or measurement of the communication beam itself.

Operation of the Invention

In operation, the variable optical attenuator 50 of the present invention transmits an optical signal from an input fiber 104 to an output fiber 304. The operation of a preferred embodiment of the present invention is perhaps best understood with reference to FIGS. 1, 3, 5A and 5B.

As depicted in FIG. 1, the guidance and control system incorporates a single un-modulated DC optical alignment beam for each input fiber. The communications beam and its companion alignment beam both pass through a micro-lens array, labeled 100 in the Figure, which transform the diverging beams into nearly collimated beams. The microlens array may have a separate micro lens for each communication beam 110, and a separate one for each alignment beam 112. After passing through the micro lens array, the communication and alignment beam pair are nearly parallel, but are purposefully misaligned slightly so that the beams cross near the center of the free space optical path. After reflecting from the appropriate elements of the two beam steering mirror arrays 200, the communication-alignment beam pair encounter a second micro lens array which focuses the two beams. The communication beam is focused onto a single output fiber and the alignment beam is focused on a sensor (e.g.,a CMOS sensor).

Operation of the device proceeds as follows. Upon system startup, each beam steering element may be positioned in its nominal flat position parallel with the plan of the grid of mirror elements as defined by element 202 in FIG. 1. At this point, the communications-alignment beam pairs are positioned without optical feedback, and the attenuator may be configured such that each alignment beam falls on the sensor corresponding to the nominal straight path, causing the communication beam to fall at the center of the output fiber (i.e., a maximum power transmission configuration). Closed-loop feedback then may be initiated on the communications-alignment beam pairs, and residual open-loop pointing errors in the beam steering elements are removed using a servo control loop.

Positioning of the communication beam may be accomplished as follows. Upon receipt of a positioning command (i.e., a request for a particular signal power transmission level), the beam steering mirrors associated with the communication beam may be appropriately positioned so that the communication beam strikes the output fiber at the proper position (as described above). The positioning of the alignment beam on the sensor may be monitored on a periodic or continual basis to assure proper positioning of the communication beam, and consistent optical signal power levels. Utilizing a continual monitoring process, for example, enables the variable optical attenuator of the present invention to accommodate transmission signal power level changes.

In a preferred embodiment, the servo loop may operate only on the mirror elements in the second mirror array. In alternative embodiments, the servo loop may operate on the mirror elements in the first mirror array, the second mirror array, or both the first and second mirror arrays.

In one embodiment, the calibration of each of the mirror elements in the first array is sufficiently accurate so that it is possible to position these elements with an open loop signal such that substantially all of the optical energy of the alignment and communications beams corresponding to each element will fall on the intended target mirror element in the second beam director array.

The open loop pointing of the beam directing mirror elements may be calibrated at manufacture, and periodically throughout the lifetime of the device, insuring that the open loop pointing accuracy is high. Also, the open loop pointing accuracy of the mirrors in the first array needs to be no better than a few percent of the full stroke since small errors in position of the first elements are, in effect compensated by the closed loop servo control system operating on elements in the second mirror array. This initial open loop pointing, in combination of the feedback control of the second beam directing elements accurately positions the communication beam onto the center of the output fiber.

Alternative Embodiments

Figure 7:
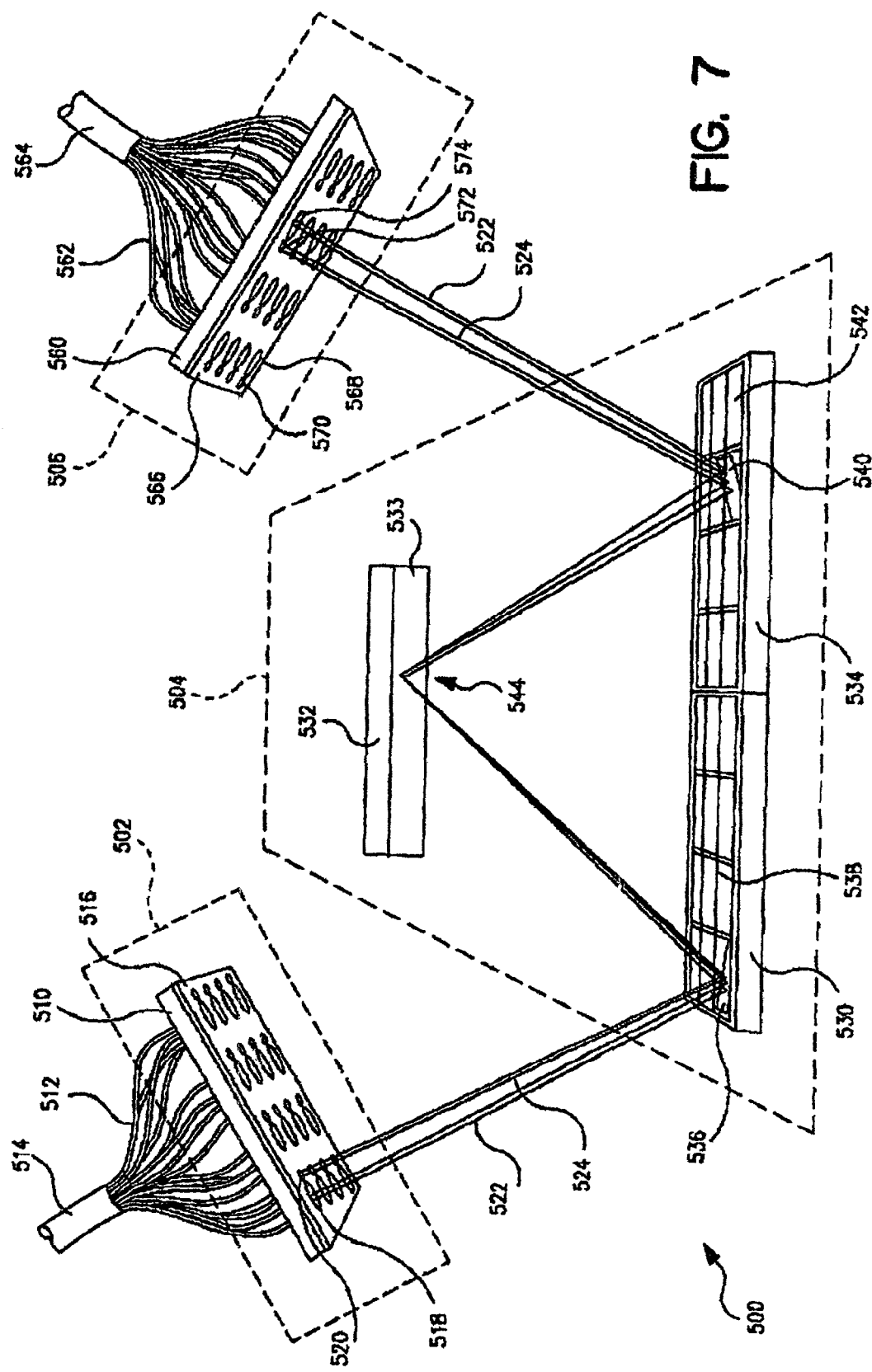
FIG. 7 is a diagrammatic representation of an alternative embodiment of the variable optical attenuator of the present invention showing the three (3) basic components, including a beam generating portion, beam directing portion, and beam receiving portion.

Referring now to FIG. 7, a diagrammatic representation of an alternative embodiment of the variable optical attenuator of the present invention is shown and generally designated 500. Attenuator 500 includes a beam generating portion 502, a beam directing portion 504, and a beam receiving portion 506. Beam generating portion 502 is an equivalent to beam generating portion 100 and beam receiving portion 506 is an equivalent to beam receiving portion 300 shown, as shown in FIG. 1.

Beam directing portion 504 includes a first beam director 530 and a second beam director 534, with each director 530 and 534 having an array of beam-directing elements 536, 538, 540 and 542. In this embodiment, and as will be discussed below in greater detail, these beam-directing elements may include micro electromechanical systems (MEMS) devices, or other beam directing elements known in the art. Beam directing portion 504 also includes a reflector 532 which has a reflective surface 533.

As shown in FIG. 7, a communication beam 522 and an alignment beam 524 are generated in beam generating portion 502 and propagate into beam directing portion 504, striking a beam directing element 536 in first beam director 530 corresponding to the lenslets 518 and 520. Beam directing element 536 re-directs communication beam 522 and alignment beam 524 to a beam directing element in second beam director 534, such as beam directing element 540. In the present embodiment, the re-directing of communication and alignment beams 522 and 524 is accomplished by reflecting these beams from reflector 532. From beam director element 540, the communication and alignment beams 522 and 524 are directed to lenslets 572 and 574.

As with the attenuator 50 shown in FIG. 1, the communication beam 522 and alignment beam 524 may converge, and may intersect midway along the optical pathway through switch 500. In the present embodiment, such intersection may occur at approximately location 544.

It is to be further realized that although the reflector 532 may be utilized, it is not essential to the present invention. As such, another embodiment of the present invention may omit the reflector 532, as shown in FIG. 7. In this alternative configuration, beam directing element 536 may direct the communication beam 522 and alignment beam 524 directly (not shown) to the beam receiving portion 506, without the use of the reflector 532.

Alternative Beam Generating and Receiving Configurations

Referring now to FIGS. 8 and 9, alternative architectures for the beam generating portion 100 and beam receiving portion 200 of the variable optical attenuator of the present invention are shown. Like beam generating portion 100, beam generating portion 600 generates a communication beam and an alignment beam -which propagate through the beam directing portion 200. Further, like beam receiving portion 300, beam receiving portion 650 receives a communication beam into an output fiber, and an alignment beam into a position sensor.

Referring initially to FIG. 8, an alternative embodiment beam generating portion 600 is shown which includes a substrate 602 formed with an array of fiber alignment holes 604 for receiving an optical fiber and associated ferrule (not shown this Figure).

An alignment beam generator 606 is either mounted to the surface of, or made integral to, substrate 602, and may include an optical fiber with an associated ferrule as described in conjunction with FIG. 2. Alternatively, alignment beam generator may include a light emitting diode (LED) 608 which emits light that is directed away from substrate 602. This light direction may be accomplished by providing a mask 610 over LED 608. In a preferred embodiment, mask 610 is formed with a small hole 611 which allows only a small portion of the light generated by LED 608 to pass through the mask in the form of a diverging light beam.

The diverging light beam from LED 608 passes through a lenslet, on panel 612, such as lenslet 614, to create an alignment beam (not shown this Figure). Light emitted from the input fiber in fiber alignment hole 604 passes through a lenslet, such as lenslet 616, on panel 612 to create a communication beam (not shown this Figure).

Beam receiving portion 650 includes a substrate 652 which is formed with an array of fiber alignment holes 654 for receiving an output fiber supported by its associated ferrule (not shown this Figure). Substrate 652 is also formed with an array of sensors 656 which may be formed integral to, or attached to the surface of, substrate 652. Panel 658 includes an array of lenslets 660 which are positioned above fiber alignment holes 654 containing output fibers, and an array of lenslets 662 which are positioned above sensors 656.

As shown in FIG. 8, the distance 618 between fiber alignment holes 604 which contain the input fibers and their associated ferrules, is substantially equal to distance 664 between fiber alignment holes 654 which contain output fibers and their associated ferrules. This spacing provides for a consistent spacing between output fibers and sensors 656, and facilitates the directing of the communication and alignment beams through the beam directing portion 300.

FIG. 9 is a plan view of another alternative architecture for the beam generating portion 100 and beam receiving portion 300 of the variable optical attenuator of the present invention. Beam generating portion 700 generates a communication beam and an alignment beam which propagate through the beam directing portion 200. Further, like beam receiving portion 300, beam receiving portion 750 receives a communication beam into an output fiber, and an alignment beam into a position sensor.

Beam generating portion 700 includes an alignment beam generator 706 is either mounted to the surface of, or made integral to, substrate 702, and includes a light emitting diode (LED) 708 which emits light that is directed away from substrate 702. The diverging light beam from LED 708 passes through a lenslet, on panel 712, such as lenslet 714, to create an alignment beam (not shown this Figure). Light emitted from the input fiber in fiber alignment hole 704 passes through a lenslet, such as lenslet 716, on panel 712 to create a communication beam (not shown this Figure).

Beam receiving portion 750 includes a substrate 752 which is formed with an array of fiber alignment holes 754 for receiving an output fiber supported by its associated ferrule (not shown this Figure). Substrate 752 is also formed with an array of sensors 756 which may be formed integral to, or attached to the surface of, substrate 752. Panel 758 includes an array of lenslets 760 which are positioned above fiber alignment holes 754 containing output fibers, and an array of lenslets 762 which are positioned above sensors 756.

Figure 10:
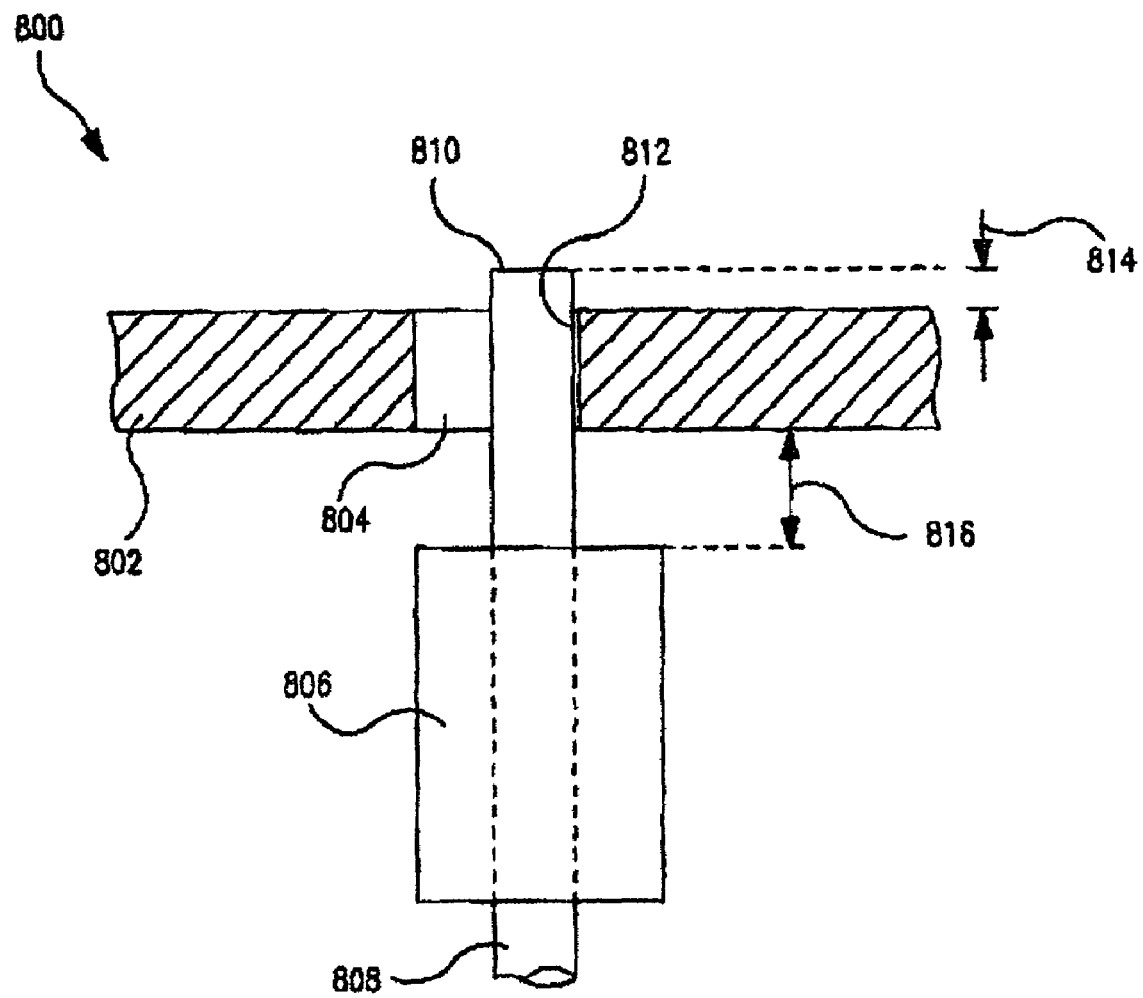
FIG. 10 is a partial cross-sectional view of the beam receiving portion of the variable optical attenuator of the present invention showing the positioning of the output fiber through a fiber alignment hole in the substrate.

Referring now to FIG. 10, a partial cross-sectional view of the beam receiving portion of the Optical Cross Connect Switch of the present invention is shown and generally designated 800. From this view, the substrate 802 is shown with an fiber alignment hole 804. Spaced behind substrate 802 is a ferrule 806 which receives an optical fiber 808 having an end 810 which extends through substrate 802 and contacts inner wall 812 of fiber alignment hole 804. Even though ferrule 806 may be positioned away from substrate 802 a distance 816, the contact between end 810 of fiber 808 and inner wall 812 of fiber alignment hole 804 provides a positive position force on fiber 810 which stabilizes the position of the fiber 804 so that a communication beam may be focused onto end 810. This same construction may be implemented in a beam generating portion to provide the proper positioning of an input fiber, such as fiber 104, for the generation of communication or alignment beams 114 or 116.

Alignment Beam

Figure 11:
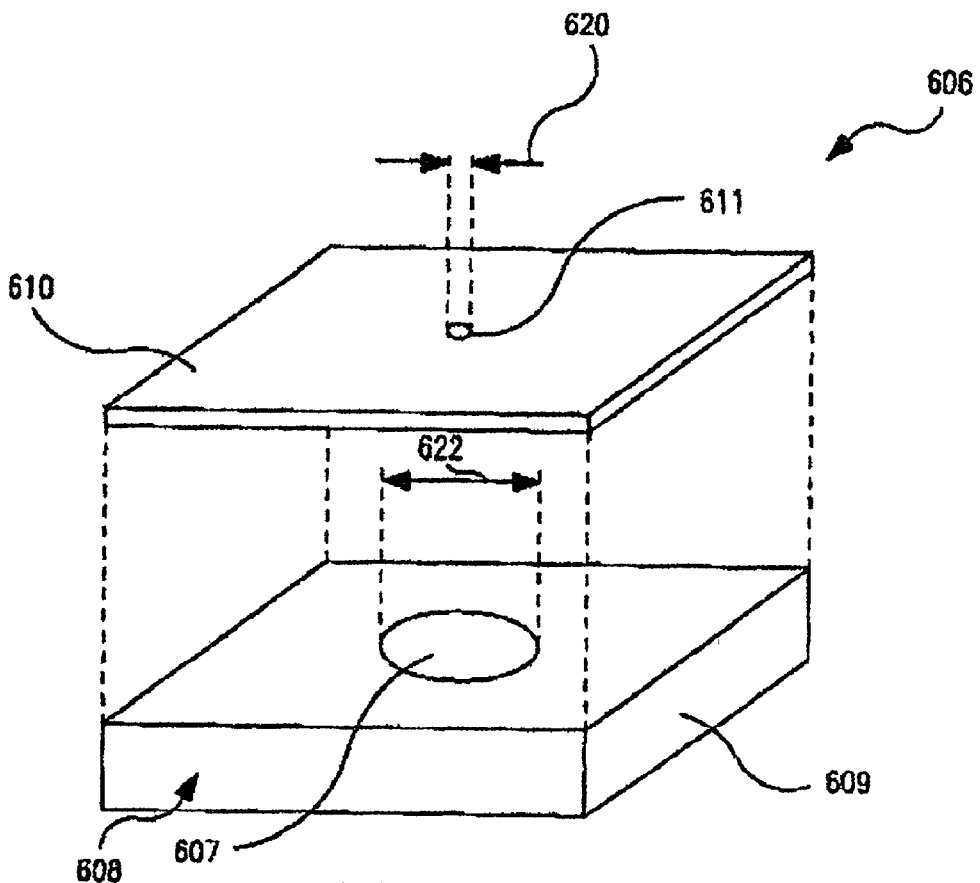
FIG. 11 is an exploded view of an alignment beam light source including a light emitting diode (LED) and a mask which allows only a portion of the light generated from the LED to be emitted for creating an alignment beam.
Figure 12:
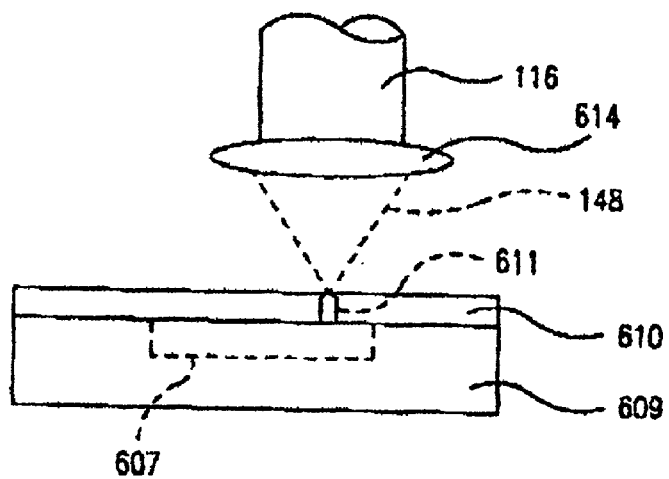
FIG. 12 is a side view of the alignment beam light source of FIG. 11, showing the creation of a diverging light beam.

Referring now to FIGS. 11 and 12, an exploded and side view of a light source for generating an alignment beam 116 are shown and generally designated 606. Alignment beam generator 606 includes a base 609 containing an LED 608 having a light emitting area 607. Mask 610 is formed with a small hole 611 having a diameter 620 which allows only a small portion of the light generated by LED 608 to propagate from the mask in the form of a diverging light beam 148. Diameter 620 is much less than diameter 622 of light emitting area 607 which provides for a strong, yet localized, source of light for creating diverging light beam 148. As diverging light beam 148 expands, it strikes lenslet 614 to create alignment beam 116 (also shown in FIG. 1).

While there have been shown what are presently considered to be preferred embodiments of the present invention, it will be apparent to those skilled in the art that various changes and modifications can be made herein without departing from the scope and spirit of the invention.

What is claimed is:

1. A method for attenuating an optical beam, said method comprising: generating a communication beam at an optical input fiber; generating an alignment beam at a beam generating element, wherein said alignment beam is associated with said communication beam; receiving said alignment beam on a sensor, wherein said sensor provides a location of said alignment beam on said sensor; and positioning said communication beam so that a desired percentage of said communication beam enters an output fiber, wherein said positioning of said communication beam comprises an offset from said location of said alignment beam.

2. The method according to claim 1, wherein said positioning is performed by a method comprising: directing said communication beam to a micro electromechanical (MEMS) device; and positioning said MEMS device so that said desired percentage of said communication beam enters said output fiber.

3. The method according to claim 1, wherein said positioning is performed by a method comprising: directing said communication beam to a first micro electromechanical (MEMS) device; positioning said first MEMS device so that said communication beam is reflected from a surface of said first MEMS device and is redirected to a second MEMS device; and positioning said second MEMS device so that said desired percentage of said communication beam enters said output fiber.

4. The method according to claim 1, said method further comprising: repeatedly receiving said alignment beam to provide updated locations of said alignment beam; and repositioning said communication beam as necessary to reflect any change in location of said alignment beam to maintain the desired percentage of said communication beam that enters said output fiber.

5. The method according to claim 1, said method further comprising: repeatedly determining said desired percentage of said communication beam that enters said output fiber to determine if said desired percentage has changed; and repositioning said communication beam as necessary to reflect any change in said desired percentage of said communication beam that enters said output fiber.

6. The method according to claim 1, said method further comprising: positioning said communication beam at about a center of a core in said output fiber so that about all of Said communication beam enters said output fiber.

7. The method according to claim 1, said method further comprising: positioning said communication beam at an offset from a center of a core in said output fiber so only a portion of said communication beam enters said output fiber.

8. The method according to claim 7, wherein each of a plurality of locations on said sensor corresponds to a particular offset that said communication beam enters said output fiber.

9. The method according to claim 1, wherein said communication beam and said alignment beam are generated at a beam generation element, and wherein said communication beam and said alignment beam proceed along paths that are substantially parallel.

10. The method according to claim 1, wherein said communication beam and said alignment beam are generated at a beam generation element, and wherein said communication beam and said alignment beam proceed along paths that are parallel.

11. The method according to claim 1, wherein said communication beam and said alignment beam are generated at a beam generation element, and wherein said communication beam and said alignment beam proceed along paths that are converging.

12. The method according to claim 11, wherein said alignment beam and said communication beam cross approximately midway along an optical path.

13. The method according to claim 1, wherein said communication beam and said alignment beam are generated at a beam generation element, and wherein said communication beam and said alignment beam proceed along paths that are coaxial.

14. The method according to claim 1, wherein said sensor comprises a sensor selected from the group selected from a position sensitive diode (PSD), a charge coupled device (CCD), and a light sensitive CMOS sensor.

15. The method according to claim 1, wherein said sensor comprises a position sensitive diode (PSD).

16. The method according to claim 1, wherein said sensor comprises a charge coupled device (CCD).

17. The method according to claim 1, wherein said sensor comprises a light sensitive CMOS sensor.

18. The method according to claim 1, wherein said alignment beam is generated by a light source selected from the group consisting of a light emitting diode (LED), an optical fiber, a laser, and a vertical cavity surface emitting laser (VCSEL).

19. The method according to claim 1, wherein said alignment beam comprises a light emitting diode (LED), said method further comprising: providing a LED mask at said beam generating element to control an amount of light produced by said LED.

20. The method according to claim 1, said method further comprising: providing a first lenslet at said beam generating element, wherein said lenslet collimates said alignment beam.

21. The method according to claim 20, said method further comprising: providing a second lenslet at a beam receiving element, wherein said second lenslet focuses said alignment beam onto said sensor.

22. The method according to claim 1, said method further comprising: providing a lenslet at said beam generating element, wherein said lenslet collimates said communication beam.

23. The method according to claim 22, said method further comprising: providing a second lenslet at a beam receiving element, wherein said second lenslet focuses said communication beam.

24. The method according to claim 1, wherein said alignment beam is generated by a light supplying fiber that is positioned in a fixed spatial relationship with said optical input fiber.

25. A method for attenuating a plurality of optical beams, said method comprising: generating a plurality of communication beams at an optical input fiber; generating a plurality of alignment beams at a beam generating element, wherein each of said plurality of alignment beams is associated with one of said plurality of communication beams; receiving each of said plurality of alignment beams at a respective sensor, wherein each of said plurality of sensors provides a location of a received alignment beam on said respective sensor; positioning each of said plurality of communication beams so that a desired percentage of each of said plurality of communication beams enters an associated output fiber; and wherein said positioning of each of said plurality of communication beams comprises an offset from an associated one of said plurality of locations of said alignment beams.

26. The method according to claim 25, wherein said positioning of each of said plurality of communication beams is performed by a method comprising: directing each of said plurality of communication beams to a micro electromechanical (MEMS) device; and positioning said MEMS device so that said desired percentage of each of said plurality of communication beams enters said associated output fiber.

27. The method according to claim 25, said method further comprising: repeatedly receiving each of said plurality of alignment beams to provide updated locations of each of said plurality of alignment beams; and repositioning each of said plurality of communication beams as necessary to reflect any change in location of each of said plurality of alignment beams to maintain the desired percentage of each of said plurality of communication beams that enter said associated output fiber.

28. The method according to claim 25, said method further comprising: repeatedly determining said desired percentage of each of said plurality of communication beams that enter said associated output fiber to determine if said desired percentage has changed; and repositioning each of said plurality of communication beams as necessary to reflect any change in said desired percentage.

29. The method according to claim 25, said method further comprising: positioning at least one of said plurality of communication beams at about a center of a core in said output fiber so that about all of said at least one of said plurality of communication beams enter said output fiber.

30. The method according to claim 25, said method further comprising: positioning at least one of said plurality of communication beams at an offset from a center of a core in said output fiber so that only a portion of said at least one of said plurality of communication beams enters said output fiber.

31. The method according to claim 25, wherein each of said plurality of communication beams and each of said plurality of alignment beams are generated at a beam generation element; and wherein each of said plurality of communication beams and each of said plurality of alignment beams proceed along paths that are substantially parallel.

32. The method according to claim 25, wherein each of said plurality of communication beams and each of said plurality of alignment beams are generated at a beam generation element; and wherein each of said plurality of communication beams and each of said plurality of alignment beams proceed along paths that are parallel.

33. The method according to claim 25, wherein each of said plurality of communication beams and each of said plurality of alignment beams are generated at a beam generation element; and wherein each of said plurality of communication beams and each of said plurality of alignment beams proceed along paths that converge.

* * * * *